United States Patent
Andreas et al.

(10) Patent No.: US 10,085,130 B1
(45) Date of Patent: Sep. 25, 2018

(54) DIFFERENTIATED WIRELESS COMMUNICATION SERVICE PROVISIONING AND CONNECTING ALTERNATE PATHWAYS

(71) Applicant: Sprint Communications Company L.P., Overland Park, KS (US)

(72) Inventors: Paul M. Andreas, Overland Park, KS (US); John E. Belser, Olathe, KS (US); Rodney D. Nelson, Overland Park, KS (US); Mark D. Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/666,565

(22) Filed: Aug. 2, 2017

(51) Int. Cl.
| | |
|---|---|
| *H04W 88/08* | (2009.01) |
| *H04W 4/50* | (2018.01) |
| *H04W 4/00* | (2018.01) |
| *H04W 4/24* | (2018.01) |
| *H04W 24/02* | (2009.01) |
| *H04W 28/02* | (2009.01) |
| *H04M 15/00* | (2006.01) |

(52) U.S. Cl.
CPC ............. *H04W 4/50* (2018.02); *H04M 15/60* (2013.01); *H04M 15/61* (2013.01); *H04W 4/001* (2013.01); *H04W 4/24* (2013.01); *H04W 24/02* (2013.01); *H04W 28/0268* (2013.01); *H04W 88/08* (2013.01)

(58) Field of Classification Search
CPC ... H04W 4/50; H04W 4/001; H04W 28/0268; H04W 24/02; H04W 4/24; H04W 88/08; H04M 15/61; H04M 15/60
See application file for complete search history.

(56) References Cited

U.S. PATENT DOCUMENTS

| | | | | |
|---|---|---|---|---|
| 2010/0130177 | A1* | 5/2010 | Ku | H04M 15/00 455/414.1 |
| 2014/0179265 | A1* | 6/2014 | Bruns | H04L 12/1492 455/406 |
| 2017/0180960 | A1* | 6/2017 | Drake | H04W 4/20 |

* cited by examiner

Primary Examiner — Chuong A Ngo

(57) ABSTRACT

A method of wireless communication. The method comprising receiving by an application executing on a mobile communication device a provisioning payload comprising a zero-rated access point name (APN) from a wireless communication network, where the zero-rated APN is used by the wireless communication network to provide a distinctive communication service to the mobile communication device without counting data tonnage associated with the distinctive communication service against a data limit of a wireless communication service plan associated with the mobile communication device, receiving by the application a command to initiate the distinctive communication service, engaging the distinctive communication service to use the zero-rated APN in conducting the distinctive communication service, and providing the distinctive communication service to the mobile communication device at a lower quality of service (QoS) by a wireless communication network node relative to a standard QoS provided to standard communication service in the wireless communication network.

19 Claims, 7 Drawing Sheets

DIFFERENTIATED WIRELESS COMMUNICATION SERVICE PROVISIONING AND CONNECTING ALTERNATE PATHWAYS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An access point name (APN) stored on a mobile communication device designates a gateway in the network through which wireless voice and/or data traffic routes between the mobile communication device and the cellular network. The mobile communication device may specify an APN for the network to use when requesting a voice or data connection from the cell tower. An APN may identify a packet data network (PDN) that a mobile communication device user wishes to communicate with and may designate a PDN gateway (PGW) and a serving gateway (SGW) for the communication. The APN may be associated with a specific manner of handling wireless voice and/or data communication with the network.

SUMMARY

In an embodiment, a method of wireless communication is disclosed. The method comprises receiving by an application executing on a mobile communication device a provisioning payload comprising a zero-rated access point name (APN) via a radio transceiver of the mobile communication device from a wireless communication network, where the zero-rated APN is used by the wireless communication network to provide a distinctive communication service to the mobile communication device without counting data tonnage associated with the distinctive communication service against a data limit of a wireless communication service plan associated with the mobile communication device. The method further comprises receiving by the application a command via the radio transceiver to initiate the distinctive communication service, engaging the distinctive communication service via the radio transceiver in part by configuring the radio transceiver to use the zero-rated APN in conducting the distinctive communication service, and providing the distinctive communication service to the mobile communication device at a lower quality of service (QoS) by a wireless communication network node relative to a standard QoS provided to standard communication service in the wireless communication network.

In another embodiment, a method of wireless communication is disclosed. The method comprises requesting, by an application via an application programming interface (API), a name of a zero-rated access point name (APN) from a wireless communication network, wherein the application is stored in a non-transitory memory and executing on a processor of a mobile communication device, identifying by the application via the API the mobile communication device and a reason for requesting the zero-rated APN to the wireless communication network, where the zero-rated APN is used to provide a distinctive communication service to the mobile communication device without counting data tonnage associated with the distinctive communication service against a data limit of a wireless communication service plan associated with the mobile communication device, and evaluating by the wireless communication network the reason for requesting the zero-rated APN. The method further comprises sending by the wireless communication network a provisioning payload comprising the zero-rated APN to the application via a radio transceiver of the mobile communication device, receiving by the application a command via the radio transceiver to initiate the distinctive communication service, and engaging the distinctive communication service via the radio transceiver in part by configuring the radio transceiver to use the zero-rated APN in conducting the distinctive communication service, whereby the communication service subscription account associated with the mobile communication device is not billed for the data usage associated with conducting the distinctive communication service.

In yet another embodiment, a mobile communication device is disclosed. The mobile communication device comprises a processor, a non-transitory memory, a radio transceiver, and an application stored in the non-transitory memory that. Upon execution by the processor, the application receives a provisioning payload comprising a zero-rated access point name (APN) via the radio transceiver from a wireless communication network, where the zero-rated APN is used by the wireless communication network to provide a distinctive communication service to the mobile communication device without counting data tonnage associated with the distinctive communication service against a data limit of a wireless communication service plan associated with the mobile communication device, receives a command via the radio transceiver to initiate the distinctive communication service, and engages the distinctive communication service via the radio transceiver in part by configuring the radio transceiver to use the zero-rated APN in conducting the distinctive communication service, whereby the communication service subscription account associated with the mobile communication device is not billed for the data usage associated with conducting the distinctive communication service.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
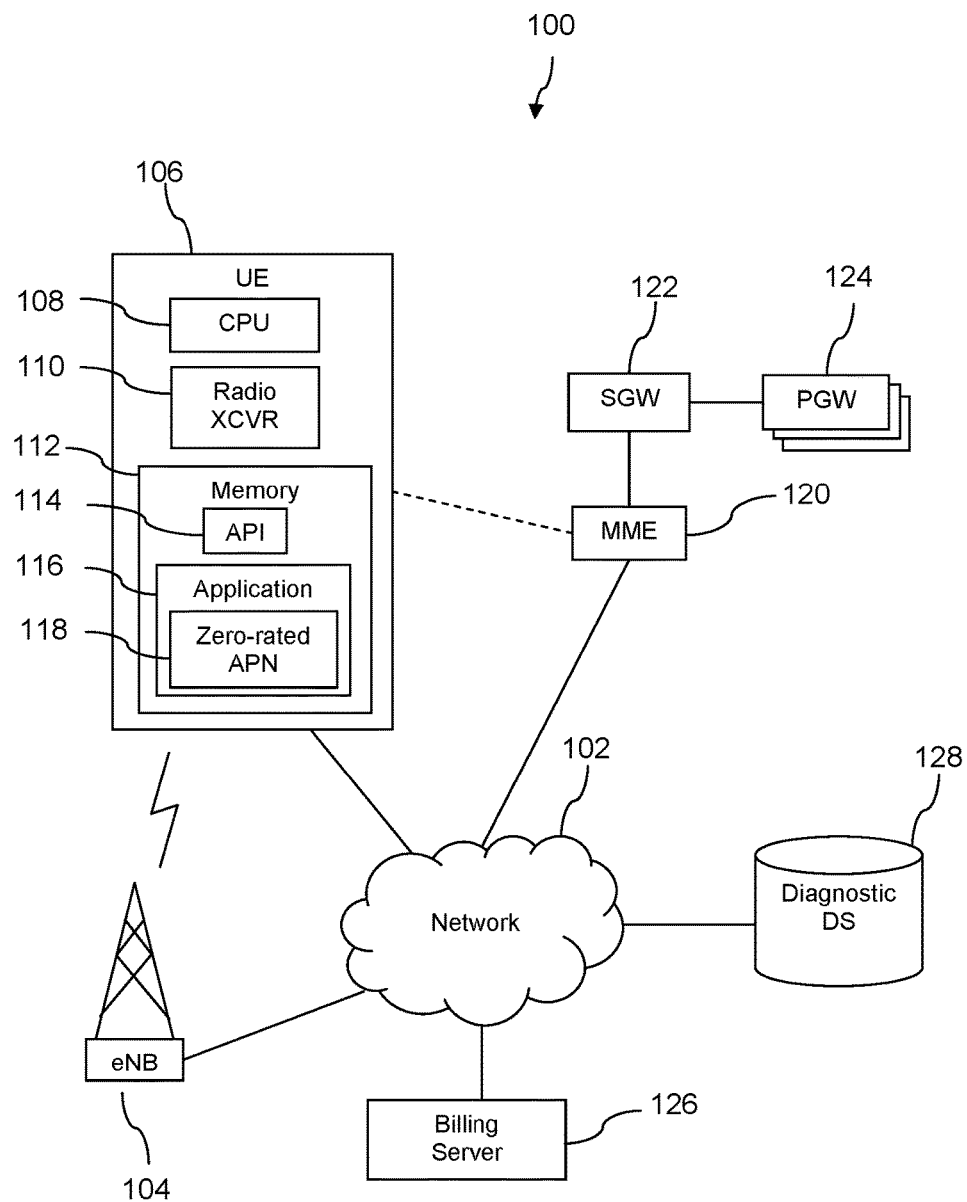
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A wireless communication service provider may desire for to perform various distinctive communication services on mobile communication devices that are connected on the wireless communication network. These distinctive communication services may improve the wireless communication services obtained or otherwise benefit the wireless communication service subscriber's experience. For example, distinctive communication services may include a wireless communication service provider distributing maintenance release (MR) files to improve or fix issues in service or the service provider streaming a temporary promotional offer on the mobile communication device. In other cases, the distinctive communication services may provide the wireless communication service provider with information associated with a mobile communication device that may aid the service provider in identifying device and/or network issues. For example, a wireless communication service provider may request diagnostic logs from a mobile communication device. In some sense, distinctive communication services may be used as a collective term to refer to one or more communication services that are not customary communications initiated by subscribers or not seen as the primary purpose of having a wireless communication service (e.g., making voice calls, sending text messages, sending MMS messages, sending pictures to a friend, browsing an Internet web site, sending and receiving email, executing a mobile gaming application, using a navigation mobile application, and others). These distinctive communication services may promote goals or objectives of the wireless communication service provider (improve network performance, provide a promotional offer, download diagnostic information from the phone).

Wireless communication subscriber acceptance rates of maintenance releases (MR) on mobile communication devices over a wireless communication network may be low due to the wireless communication subscriber not wanting to use data (e.g., receive data comprising the MR over the wireless channel) that would count against a data limit of a wireless communication service plan. An MR file may update the software or firmware of a mobile communication device to fix problems associated with the device. In an embodiment, an MR may fix device-side issues or device-network interaction issues that may cause degradation of service to the wireless communication subscriber. Regulatory restrictions may mandate that the wireless service provider obtain the approval of the wireless communication subscriber before taking actions that would toll the data limits of wireless communication subscriber accounts. However, a wireless communication subscriber may not accept data from an MR because the data would count against data limit of the wireless communication subscriber account. A wireless communication subscriber may also be reluctant to share diagnostic data and/or diagnostic logs containing important operation information from their mobile communication device to the service provider over the wireless network to avoid tolling their data counts. Sharing diagnostic data may be desired to troubleshoot and repair issues with the mobile communication device or to repair larger issues in the wireless communication network.

The present disclosure teaches a zero-rated access point name (APN) that enables data traffic to be sent and received without tolling the data limit of wireless subscription accounts of the wireless network communication subscribers. An access point name (APN) is a gateway between a mobile network and another computer network. A wireless communication service provider may desire to send or receive data from a mobile communication device in order to improve problems associated with the device and/or wireless communication network. Often, wireless communication subscribers are reluctant to download or send data because it would reduce the remaining data limit of their subscription (or consume data and bring the device closer to exceeding the data limit). In some cases, a wireless service provider may manually apply credits to subscribers to offset the data used in a data transaction. However, wireless communication subscribers may deceitfully report the true amount of data used in an effort to gain free data. A wireless communication service provider may have millions of subscribers. Verifying the data used would place a tremendous strain on network infrastructure and company resources.

Implementing a zero-rated APN on a wireless communication device solves this technical challenge by providing alternate pathways for a mobile communication device to receive or transmit data in a way that would not undesirably impact a data limit of the wireless communication subscription plan. A zero-rated APN may improve the wireless communication experience for a wireless communication service subscriber since it allows the device to acquire the most recent software update (e.g., an operating system update, a patch, a hotfix, a bug fix) that may allow the mobile communication device to operate more smoothly and effectively on the wireless communication network while also reducing the risk of a wireless communication subscriber fraudulently using a zero-rated APN for personal benefit.

When an application executing on the mobile communication device needs to communicate wirelessly, without impacting the subscriber's data limit, the application may establish wireless communication based on the zero-rated APN. The application may be an application that collects diagnostics information and establishes the wireless communication link based on the zero-rated APN to deliver diagnostics information to the wireless communication service provider. The application may be a streaming video application that downloads and plays video content and establishes the wireless communication link based on the zero-rated APN pursuant to a special temporary promotional offer. The application may be involved in downloading and activating maintenance release (MR) data and/or logic and establishes the wireless communication link based on the zero-rated APN to download MR data to promote completion of a maintenance release.

In an embodiment, to reduce the risk of fraudulent use of the zero-rated APN, an application executing on the mobile communication device wishing to communicate based on the zero-rated APN (e.g, the diagnostics application) may request a name of a zero-rated APN from the wireless communication network via an application programming interface (API) used by an application. The API may be embedded in the application (e.g., embedded in each of the applications that may request a zero-rated APN to use in establishing a wireless communication link) or may be embedded in an operating system (OS) of the mobile communication device and invoked by an application as an OS system call. The invocation of a method of the API may then identify the mobile communication device and the reason for using the zero-rated APN to the wireless communication network. The wireless communication network may then evaluate the request for the zero-rated APN and approve the request by sending the zero-rated APN in a response to the API method invocation or deny the request. This implementation may be utilized to prevent fraudulent activity of the zero-rated APN. Fraudulent activity may occur if a mobile communication subscriber uses or attempts to use the zero-rated APN to engage in communication services not intended for the zero-rated APN. The zero-rated APN may also be restricted to a constrained network domain of the distinctive communication service to prevent fraudulent activity. In an embodiment, a constrained network domain may limit the zero-rated APN to a "white list" of acceptable IP addresses, wherein a "white listed" IP address of a server may have permission to use the zero-rated APN. In another embodiment, the zero-rated APN may be configured to only carry out a certain distinctive communication service (e.g., download MRs, transmit diagnostic logs, stream videos) to prevent fraudulent use by the wireless communication subscriber.

A zero-rated APN may be used in many other ways by the service provider to transmit data over the wireless communication network to a mobile communication device. In an embodiment, more than one zero-rated APN may be configured on a mobile communication device, wherein each zero-rated APN may be configured to handle different types of data traffic. For example, a service provider may use a zero-rated APN to stream content to the mobile communication device of a subscriber pursuant to a temporary promotional offer for a delimited time period. For example, the temporary promotional offer may be streaming a sporting event on the mobile communication device without counting against the data limit of the subscriber account. The data traffic associated with the zero-rated APN may be given a lower quality of service (QoS) relative to a standard QoS provided to a data traffic associated with a full-rated APN. A full-rated APN handles data traffic that counts against a data limit of a subscriber account such as performing a standard communication service to the mobile communication device. In other words, a wireless communication subscriber pays for the data traffic associated with a full-rated APN.

In an embodiment, an application stored in the non-transitory memory of a mobile communication device receives a provisioning payload comprising a zero-rated APN. Upon receiving a command to initiate a distinctive communication service, the zero-rated APN is engaged by the application to provide the distinctive communication service to the mobile communication device without counting data tonnage associated with the distinctive communication service against a data limit of a wireless communication service plan associated with the mobile communication device. In some embodiments, the mobile communication device may be referred to as a user equipment (UE). For example, the distinctive communication service may be downloading a maintenance release (MR) file for updating the firmware or software of the mobile communication device. A MR may upgrade the firmware or software, fix a known problem such as a device-network interaction issue, and/or roll out a new feature of the mobile communication device.

In another example, the distinctive communication service may be forwarding diagnostic information of the mobile communication device to a diagnostic data store of the wireless communication network for troubleshooting wireless communication service technology. In an embodiment, the diagnostic information may be referred to as a diagnostic log. Diagnostic information may contain information detailing the environment in which the device in operating. The information may be used to troubleshoot and repair issues with the mobile communication device or be used to repair issues in the wireless communication network. In an embodiment, the diagnostic information may be requested by the service provider from the wireless communication subscriber. The service provider may request diagnostic logs from specific subscribers, such as requesting diagnostic logs from subscribers located within a geographic area and/or subscribers who use a specific model of a mobile communication device. Diagnostic logs may be forwarded to the diagnostic server of the wireless communication network after a predetermined period of time, such as after one week, one month, six month, one year, or any other predetermined period of time.

In yet another example, the distinctive communication service may be streaming content pursuant to a temporary promotional offer. The application may restrict the use of the zero-rated APN to a delimited time period identified in the provisioning payload, such as for one hour, one day, one week, one month, or any other time period identified in the provisioning payload. In an embodiment, the streaming content may be a livestreamed sporting event. The streaming content may also be a movie or television show. It is understood that distinctive communication services are not limited to the distinctive communication services described herein and may be any communication service where the service provider wishes to provide data traffic that would not count against a data limit of a wireless communication subscriber plan.

The zero-rated APN may either be stored permanently on the mobile communication device or be stored for a specific period of time on the mobile communication device before deletion. The zero-rated APN may have an associated expiration date so that it is automatically deleted once the expiration date is reached. The expiration date may be supported by an operating system of the mobile communication device or controlled and enforced by the wireless communication network. A zero-rated APN may be deleted upon completion of a distinctive communication service. A zero-rated APN may be pre-loaded on a mobile communication device or downloaded from the wireless communication network via a provisioning payload.

Turning now to FIG. 1, a system 100 is described. The system 100 comprises a wireless communication network 102, an eNodeB (eNB) 104, a user equipment (UE) 106, a mobility management entity (MME) 120, a billing server 126, and a diagnostic data store 128. The wireless communication network 102 may comprise a public network, a private network, or a combination thereof. It is understood that the system 100 may comprise any number of eNBs 104, UEs 106, MMEs 120, billing servers 126, and diagnostic data stores 128. The UE 106 may be referred to as a mobile communication device 106, wherein the mobile communication device 106 is one of a mobile phone, a smart phone, a personal digital assistant (PDA), a wearable computer, a headset computer, a media player, a laptop computer, a notebook computer, or a tablet computer.

In an embodiment, the mobile communication device 106 comprises a central processing unit (CPU) 108, a radio transceiver 110, and a memory 112 comprising an application programming interface (API) 114, an application 116, and a zero-rated access point name (APN) 118 loaded in the application 116. While illustrated outside of the application 116 (e.g., embedded in an operating system of the device 106 and accessed by the application 116 via a system call to the operating system), in an embodiment the API 114 may be a part of the application 116, for example compiled into the application 116.

The application 116 may be any of a variety of applications. The application 116 may be an application that promotes completion of maintenance release activities. The application 116 may be a streaming content application. The application 116 may be a diagnostics application that collects diagnostics information on the device 106 and reports the information back to a wireless communication service provider. It is understood that the present disclosure contemplates that a plurality of applications 116 may be installed on the device 106 at the same time, and two or more of those applications 116 may be able to request and use a zero-rated APN to establish a wireless communication link.

The mobile communication device 106 may be communicatively coupled to the eNB 104 over the radio wireless communication network 102. In some contexts the eNB 104 may be referred to as a cell site. The radio transceiver 110 may establish wireless communication links with an eNB 104 according to a long term evolution (LTE), a code division multiple access (CDMA), a global system for mobile communication (GSM), or a worldwide interoperability for microwave access (WiMAX) wireless communication protocol. The MME 120 may be communicatively coupled to the mobile communication device 106, a serving gateway (SGW) 122, and a packet data network (PDN) gateway (PGW) 124.

The MME 120 processes requests by the mobile communication device 106 for access to the wireless communication network 102. When a request is made by the mobile communication device 106 to access the wireless communication network 102, the MME 120 may first authenticate and authorize the mobile communication device 106 and then select the SGW 122 to be used by the mobile communication device 106. When the mobile communication 106 has been authorized to conduct a network session by the MME 120, the MME 120 connects the mobile communication device 106 to a SGW 122, and the SGW 122 selects the PGW 124 to be used for the network session. In an embodiment, a mobile communication device 106 may conduct more than one data session to a plurality of PGWs 124 simultaneously.

In an embodiment, the application 116 receives a provisioning payload comprising a zero-rated APN 118 via the radio transceiver 110 from the wireless communication network 102. The zero-rated APN 118 is used to provide a distinctive communication service to the mobile communication device 106 without counting data tonnage associated with performing the distinctive communication service against a data limit of a wireless communication service plan associated with the mobile communication device 106. A wireless communication subscriber of the mobile communication device 106 may be required to grant permission for the zero-rated APN 118 to perform the distinctive communication service on the mobile communication device 106 by accepting an inquiry from the wireless communication service provider over the wireless communication network 102.

In an embodiment, the distinctive communication service may be one of downloading a maintenance release (MR) file for updating one of firmware or software of the mobile communication device 106. The MR file may be used to fix issues related to specific mobile communication devices 106 such as issues that may be causing a poor user experience. The MR file may also be used to fix interaction problems between the mobile communication device 106 and the wireless communication network 102.

In another embodiment, the distinctive communication service may be forwarding diagnostic information collected by the mobile communication device 106 to a diagnostic data store 128 on the wireless communication network 102. The forwarded diagnostic information from the mobile communication device 106 may be referred to as diagnostic logs. The collected diagnostic data may be used by the wireless communication service provider to troubleshoot problems associated with specific mobile communication devices 106 belonging to specific customers or similar models of mobile communication devices 106. The mobile communication device 106 may periodically send diagnostic logs using the zero-rated APN 118 to the diagnostic data store 128 after a predetermined time period, such as every week, every two weeks, every month, every six months, or any other predetermined time period. Diagnostic logs collected in the diagnostic data store 128 may also be used by the communication service provider to resolve issues in the wireless communication network 102. It is understood that a distinctive communication service may be any activity of transmitting data on the wireless communication network 102 wherein the communication service provider does not wish to count against the data limit of the wireless communication service plan associated with the wireless communication device 106.

In an embodiment, when the distinctive communication service is performed on behalf of the mobile communication device 106, the device obtains the distinctive communication service based on the zero-rated APN without counting data tonnage associated with the distinctive communication service against the data limit of the wireless communication service plan associated with the mobile communication device 106, the data tonnage used by the zero-rated APN 118 is sent to a billing server 126 on the wireless communication network 102. The billing server 126 counts the data tonnage used to perform the distinctive communication service for recordkeeping by the communication service provider, but does not charge the data tonnage to the mobile communication service plan associated with the mobile communication device 106 that performed the distinctive communication service. In an embodiment, the data tonnage tallied by the billing server 126 associated with the distinctive communication service performed based on the zero-rated APN 118 may be compared to the data tonnage estimate associated with the distinctive communication service performed based on the zero-rated APN 118 to confirm that no fraudulent activities associated with the mobile communication device 106 have occurred.

The zero-rated APN 118 may either exist permanently on the mobile communication device 106 or exist for a specific period of time on the mobile communication device 106 before deletion from the mobile communication device 106. The period of time may be supported by an operating system of the mobile communication device 106 or controlled and enforced by the wireless communication network 102. In an embodiment, a zero-rated APN 118 may be deleted upon completion of a distinctive communication service or when an expiration date associated the zero-rated APN 118 is reached. In an embodiment, the zero-rated APN 118 may be preloaded on the mobile communication device 106 prior to the first use of the mobile communication device 106 by the wireless communication subscriber. It is understood that the zero-rated APN 118 may be configured to perform more than one type of a distinctive communication service or the zero-rated APN 118 may only be configured to perform a unique distinctive communication service.

Figure 2:
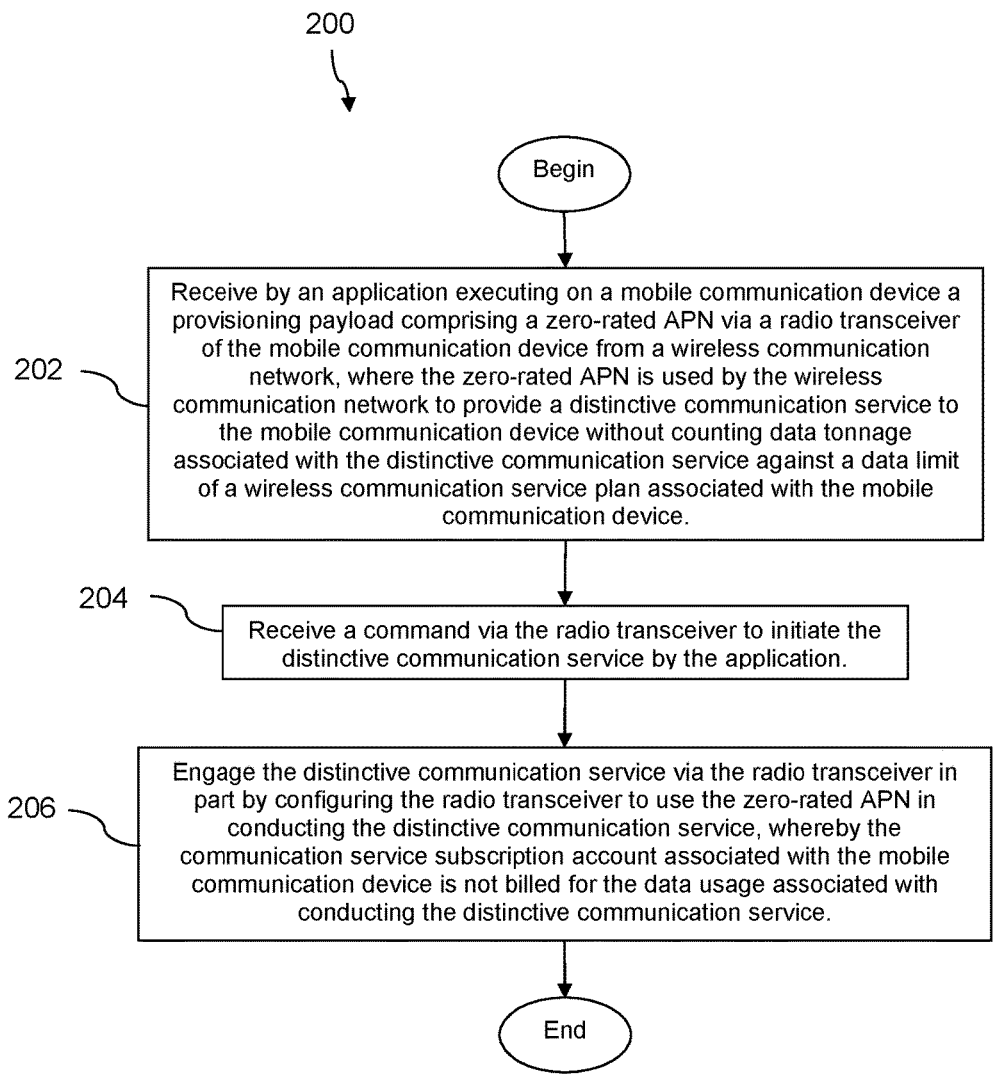
FIG. 2 is a flow chart of a method according to an embodiment of the disclosure.

Turning now to FIG. 2, a method 200 is described. The method 200 may be used to provide a distinctive communication service to a mobile communication device 106 of a wireless communication network 102 via a zero-rated APN 118 on the mobile communication device 106 without counting data tonnage associated with the distinctive communication service against a data limit of a wireless communication plan associated with the mobile communication device 106. At block 202, an application executing on a mobile communication device receives a provisioning payload comprising a zero-rated APN via a radio transceiver of the mobile communication device from a wireless communication network, where the zero-rated APN is used by the wireless communication network to provide a distinctive communication service to the mobile communication device without counting data tonnage associated with the distinctive communication service against a data limit of a wireless communication service plan associated with the mobile communication device.

At block 204, the application receives a command via the radio transceiver to initiate the distinctive communication service by the application. For example, the distinctive communication service may be one of forwarding diagnostic information collected by the mobile communication device to the wireless communication network for troubleshooting wireless communication service technology, downloading a maintenance release (MR) file for updating one of firmware or software of the mobile communication device, or streaming content pursuant to a temporary promotional offer and wherein the application restricts use of the zero-rated APN to a delimited time period identified in the provisioning payload.

At block 206, the distinctive communication service is engaged via the radio transceiver in part by configuring the radio transceiver to use the zero-rated APN in conducting the distinctive communication service, whereby the communication service subscription account associated with the mobile communication device is not billed for the data usage associated with conducting the distinctive communication service. In an embodiment, the application 116 of mobile communication device 106 may further engage a standard communication service via the radio transceiver 110 in part by configuring the radio transceiver 110 to use a full-rate APN in conducting the standard communication service, whereby the communication service subscription account associated with the mobile communication device 106 is billed for the data usage associated with conducting the standard communication service.

In an embodiment, the distinctive communication service associated with the zero-rated APN 118 may be restricted to a constrained network domain. A constrained network domain may use the gateway to limit the zero-rated APN to a "white list" of acceptable IP addresses. In the example of using a zero-rated APN to temporarily stream a promotional offer such as a sporting event, the IP address of the server may be temporarily white listed for a predetermined time period. The zero-rated APN 118 on the mobile communication device 106 may be configured to only carry out a certain distinctive communication service to prevent fraudulent use by the wireless communication subscriber. A wireless communication subscriber may attempt to use the zero-rated APN 118 to engage in communication services not intended for the zero-rated APN 118 in order to use data without having the communication service count against the data limit of the communication service subscription account.

To further prevent fraudulent activity associated with the zero-rated APN 118, the mobile communication device 106 may request a name of a zero-rated APN 118 from the radio access network 102 via a predefined API 114 on the mobile communication device 106 wherein the predefined API 114 identifies the mobile communication device 106 to the radio access network 102 and the reason for using the zero-rated APN 118. The radio access network 102 may then evaluate the circumstances of the request and reason and either send the name of the zero-rated APN 118 or deny the request of the mobile communication device 106. It is understood that a mobile communication device 106 may comprise of one or more of a zero-rated APN 118, wherein each zero-rated APN may provide access to one or more of a distinctive communication service from the wireless communication network 102.

Figure 3:
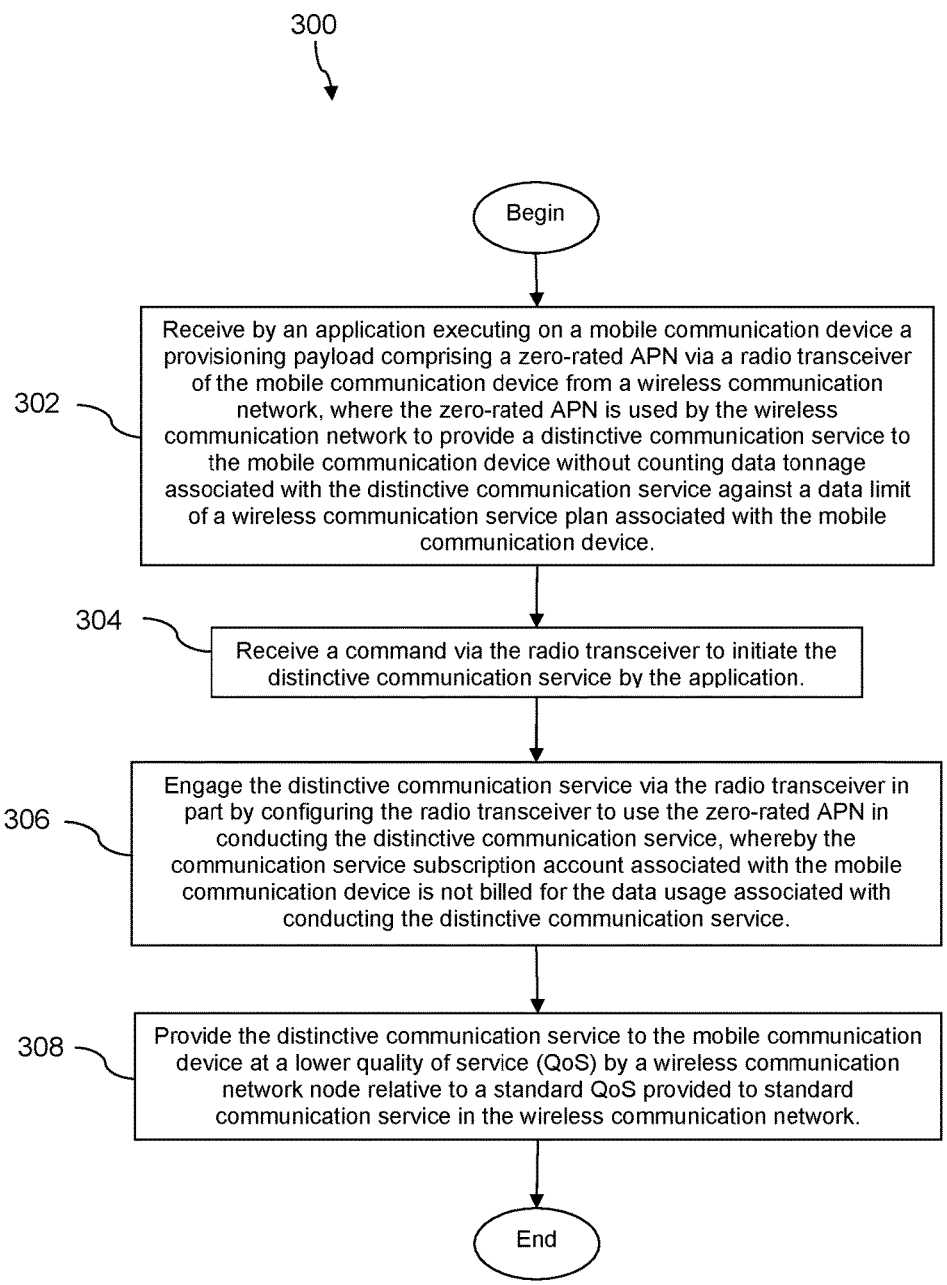
FIG. 3 is a flow chart of a method according to an embodiment of the disclosure.

Turning now to FIG. 3, a method 300 is described. The method 300 may be used to provide a distinctive communication service to a mobile communication device 106 of a radio access network 102 via a zero-rated APN 118 on the mobile communication device 106 without counting data tonnage associated with the distinctive communication service against a data limit of a wireless communication plan associated with the mobile communication device 106. At block 302, an application executing on a mobile communication device receives a provisioning payload comprising a zero-rated APN via a radio transceiver of the mobile communication device from a wireless communication network, where the zero-rated APN is used by the wireless communication network to provide a distinctive communication service to the mobile communication device without counting data tonnage associated with the distinctive communication service against a data limit of a wireless communication service plan associated with the mobile communication device.

At block 304, the application receives a command via the radio transceiver to initiate the distinctive communication service. At block 306, the distinctive communication service is engaged via the radio transceiver in part by configuring the radio transceiver to use the zero-rated APN in conducting the distinctive communication service, whereby the communication service subscription account associated with the mobile communication device is not billed for the data usage associated with conducting the distinctive communication service.

At block 308, the distinctive communication service is provided to the mobile communication device at a lower quality of service (QoS) by a wireless communication network node relative to a standard QoS provided to standard communication service in the wireless communication network. The standard communication service may be one using a full-rate APN whereby the communication service subscription account associated with the mobile communication device 106 is billed for the data usage associated with conducting the standard communication service. In an embodiment, the lower QoS using the zero-rated APN 118 may be downloading and/or transmitting data over the wireless communication network 102 at a slower speed or lower quality giving precedence to data transmitted using a full-rate APN to the mobile communication device 106.

Figure 4:
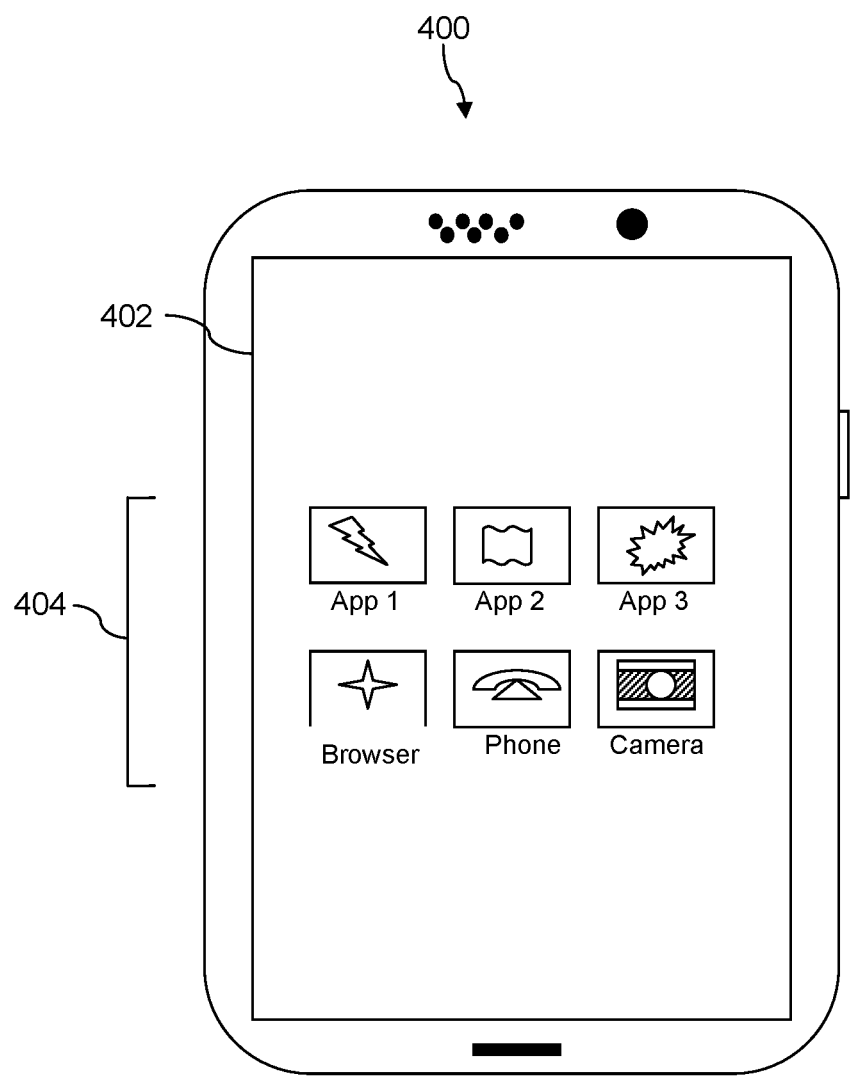
FIG. 4 is a block diagram of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
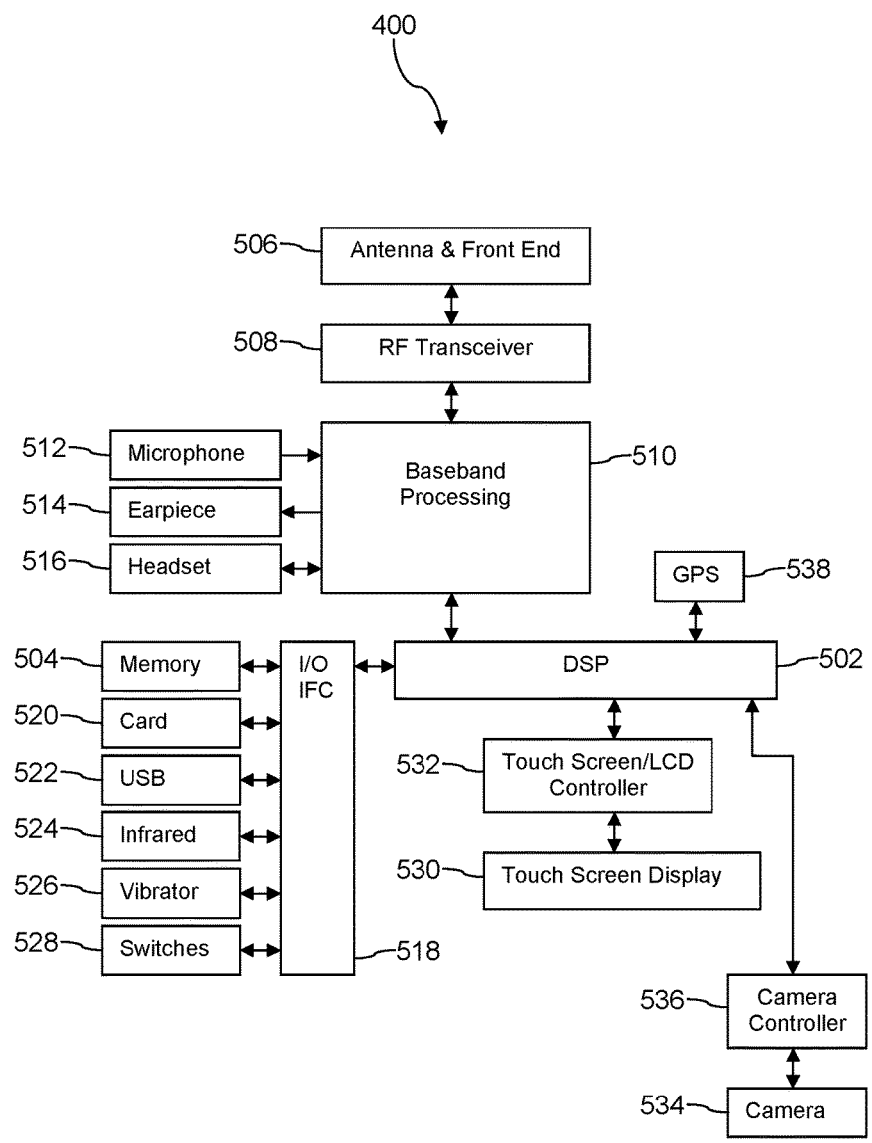
FIG. 5 is a block diagram of a computer system according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
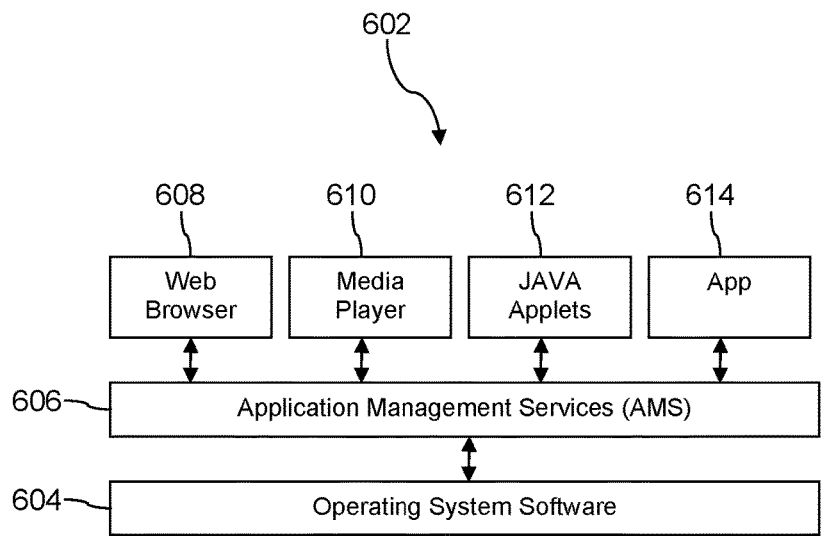
FIG. 6A is a block diagram of a computer system according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

The third party application 614 may be dynamically downloaded and installed during a first time that the mobile communication device 400 enters the retail store 104 (e.g., any of a plurality of retails stores associated with a particular enterprise) and may be activated on subsequent entries into the retail store 104. Alternatively, the third party application 614 may be installed in another way (e.g., the user elects to install the application 614, for example to obtain coupons or other desirable features provided via the application 614).

Figure 6B:
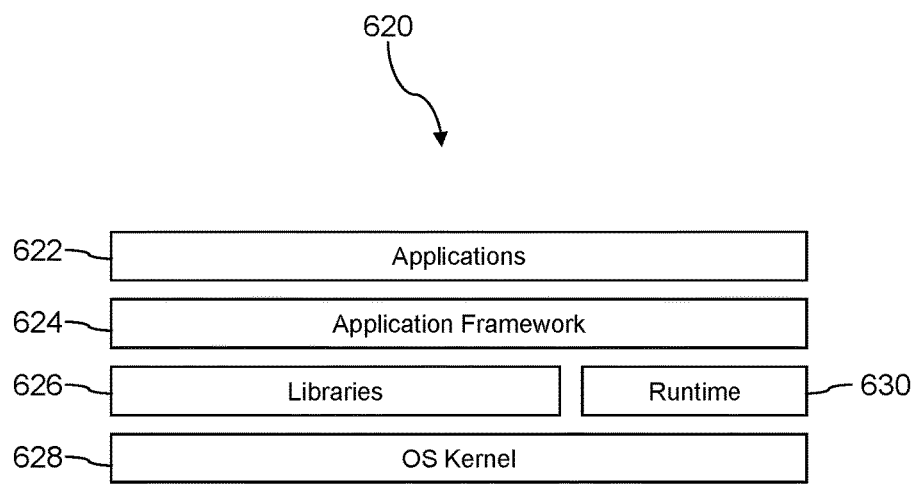
FIG. 6B is a block diagram of a computer system according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
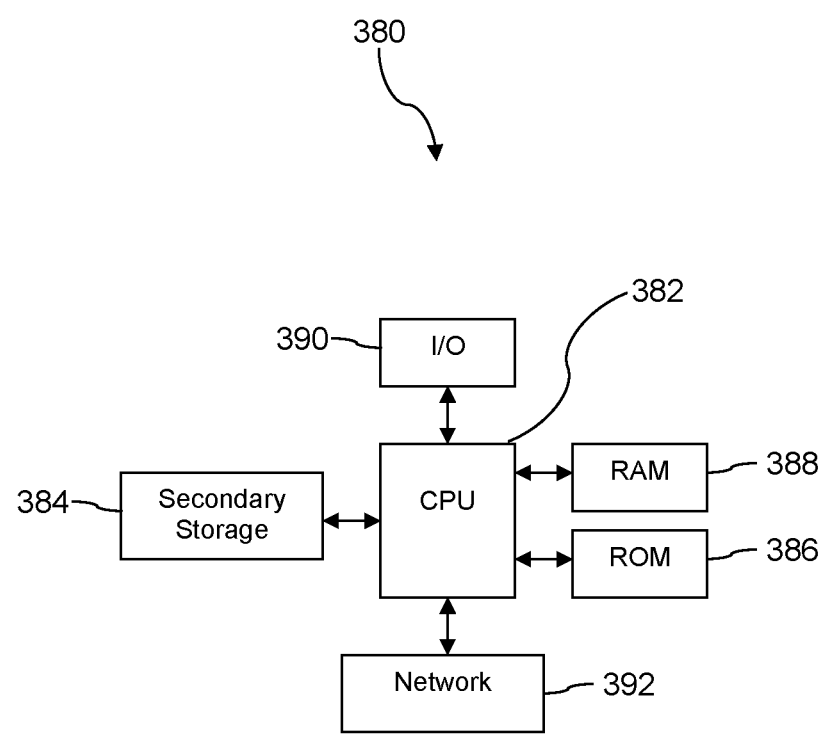
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of wireless communication, comprising:
   requesting, by an application executing on a mobile communication device via an application programming interface (API), a name of a zero-rated access point name (APN) from a wireless communication network;

identifying, by the application via the API, the mobile communication device and a reason for requesting the zero-rated APN to the wireless communication network;

evaluating, by the wireless communication network, the reason for requesting the zero-rated APN;

sending, by the wireless communication network, a provisioning payload comprising the zero-rated APN to the application via a radio transceiver of the mobile communication device based on the evaluating;

receiving, by the application, the provisioning payload comprising the zero-rated APN via the radio transceiver of the mobile communication device from the wireless communication network, where the zero-rated APN is used by the wireless communication network to provide a distinctive communication service to the mobile communication device without counting data tonnage associated with the distinctive communication service against a data limit of a wireless communication service plan associated with the mobile communication device;

receiving, by the application, a command via the radio transceiver to initiate the distinctive communication service;

engaging the distinctive communication service via the radio transceiver in part by configuring the radio transceiver to use the zero-rated APN provided in the provisioning payload in conducting the distinctive communication service; and providing the distinctive communication service to the mobile communication device using the zero-rated APN provided in the provisioning payload, wherein the distinctive communication service is provided at a lower quality of service (QoS) by a wireless communication network node relative to a standard QoS provided to standard communication service in the wireless communication network.

2. The method of claim 1, wherein the standard communication service associated with the standard QoS is that of a full-rated APN whereby the standard communication service counts against the data tonnage of the communication service subscription account associated with the mobile communication device.

3. The method of claim 1, further comprising the mobile communication device accepting an inquiry from the wireless communication service provider via the wireless communication network to allow the distinctive communication service to be performed on the mobile communication device based on the zero-rated APN.

4. The method of claim 1, wherein the zero-rated APN providing the distinctive communication service expires after a delimited amount of time that is identified in the provisioning payload.

5. The method of claim 1, further comprising more than one type of distinctive communication service being performed on the mobile communication device based on a zero-rated APN.

6. The method of claim 5, wherein the more than one type of distinctive communication service comprises streaming content pursuant to a temporary promotional offer, forwarding diagnostic information collected by the mobile communication device to be forwarded to the wireless communication network for troubleshooting wireless communication service technology, and downloading a maintenance release file for updating one of firmware or software of the mobile communication device.

7. The method of claim 1, wherein the mobile communication device is one of a mobile phone, a smart phone, a personal digital assistant (PDA), a wearable computer, a headset computer, a media player, a laptop computer, a notebook computer, or a tablet computer.

8. The method of claim 1, wherein the radio transceiver established wireless communication links with a cell site according to a long term evolution (LTE), a code division multiple access (CDMA), a global system for mobile communication (GSM), or a worldwide interoperability for microwave access (WiMAX) wireless communication protocol.

9. The method of claim 1, wherein the distinctive communication service associated with the zero-rated APN is restricted to a constrained network domain.

10. The method of claim 9, wherein the constrained network domain limits the use of the zero-rated APN to a "white list" of acceptable Internet protocol (IP) addresses.

11. The method of claim 1, wherein the data tonnage associated with conducting the distinct communication service is collected by a billing server but the mobile communication device associated with the communication subscription account is not billed by the billing server.

12. The method of claim 1, further comprising storing the zero-rated APN in a memory of the mobile communication device.

13. The method of claim 12, further comprising deleting the zero-rated APN from the memory of the mobile communication device after a predefined period of time.

14. The method of claim 13, where the predefined period of time is one day, one week, one month, six months, or one year.

15. The method of claim 1, wherein the distinctive communication service comprises streaming content pursuant to a temporary promotional offer, and wherein the application restricts use of the zero-rated APN to a delimited time period identified in the provisioning payload.

16. The method of claim 1, wherein the application is a streaming content application.

17. The method of claim 1, further comprising periodically sending, by a diagnostic application, diagnostic logs using the zero-rated APN to a diagnostic data store.

18. The method of claim 1, further comprising downloading, by an application that promotes completion of maintenance release activities, a maintenance release file using the zero-rated APN.

19. The method of claim 1, wherein more than one zero-rated APN is configured on the mobile communication device, and wherein each zero-rated APN is associated with a different distinctive communication service.

* * * * *